United States Patent
Huffington et al.

(10) Patent No.: US 7,069,090 B2
(45) Date of Patent: Jun. 27, 2006

(54) SYSTEMS AND METHODS FOR PROVIDING VARIABLE OUTPUT FEEDBACK TO A USER OF A HOUSEHOLD APPLIANCE

(75) Inventors: Jeff Huffington, Peachtree City, GA (US); Alton Harkcom, Hechingen-Sickingen (DE)

(73) Assignee: E.G.O. North America, Inc., Newnan, GA (US)

( * ) Notice: Subject to any disclaimer, the term of this patent is extended or adjusted under 35 U.S.C. 154(b) by 114 days.

(21) Appl. No.: 10/910,187

(22) Filed: Aug. 2, 2004

(65) Prior Publication Data

US 2006/0025874 A1   Feb. 2, 2006

(51) Int. Cl.
*G05B 13/02* (2006.01)

(52) U.S. Cl. .............. 700/45; 700/21; 700/33; 700/44; 700/79; 700/80; 700/81; 700/83; 340/693.12; 340/815.4; 340/500; 340/825.36; 340/825.39; 714/1; 714/7; 714/8; 714/57

(58) Field of Classification Search .......... 700/21, 700/45, 79, 17, 83, 80, 81, 82, 33, 44; 340/693.12, 340/815.4, 500, 825.36, 825.39; 714/57, 714/7–8

See application file for complete search history.

(56) References Cited

U.S. PATENT DOCUMENTS

| | | | | |
|---|---|---|---|---|
| 5,272,300 A * | 12/1993 | Edamura | ..................... | 219/702 |
| 5,293,028 A * | 3/1994 | Payne | ....................... | 219/486 |
| 5,786,996 A | 7/1998 | Vitkus et al. | | |
| 5,818,428 A * | 10/1998 | Eisenbrandt et al. | ........ | 345/173 |
| 5,841,112 A * | 11/1998 | Brooks et al. | ............. | 219/506 |
| 6,097,016 A * | 8/2000 | Hirata et al. | ................ | 219/720 |
| 6,201,997 B1 | 3/2001 | Giers | | |
| 6,750,433 B1 * | 6/2004 | Guenther et al. | ........... | 219/506 |
| 6,933,474 B1 * | 8/2005 | Shukla et al. | ............... | 219/487 |
| 6,951,997 B1 * | 10/2005 | Larson et al. | ............... | 219/492 |
| 2003/0080111 A1 * | 5/2003 | Blanchard et al. | ........... | 219/492 |
| 2004/0160335 A1 * | 8/2004 | Reitmeier | .................... | 340/825 |
| 2005/0274712 A1 * | 12/2005 | Gagas et al. | ................ | 219/494 |

* cited by examiner

*Primary Examiner*—Ramesh Patel
(74) *Attorney, Agent, or Firm*—Alston & Bird LLP

(57) ABSTRACT

An embodiment of the present invention uses an on-board microcontroller of a household appliance to receive signals from a directionless encoder attached to a knob for receiving user input and processing the signals from the direction encoder according to a control algorithm. The microcontroller may increase the output to an electric heating element on the appliance based on a variety of criteria, including either direction of rotation, current heating element setting, or a change in directional rotation. Alternatively, or in addition, the microcontroller may provide various types of graduate visual or aural feedback to the user regarding the output provided by the microcontroller.

36 Claims, 6 Drawing Sheets

SYSTEMS AND METHODS FOR PROVIDING VARIABLE OUTPUT FEEDBACK TO A USER OF A HOUSEHOLD APPLIANCE

FIELD OF THE INVENTION

The present invention relates generally to user control systems for household appliances. More particularly, variable visual and/or audible feedback if provided to a user of a kitchen appliance to facilitate ready determination of the status of the appliance.

BACKGROUND OF THE INVENTION

Traditionally, household appliance controls have been based on mechanical components. Mechanical timers, relays, and solenoids were used to effect various cycles of operation, opening and closing circuits, and actuating mechanical assemblies. Through decades of design and refinement, these controls provide a lost cost approach of achieving the basic functionality found in many household appliances.

However, mechanical assemblies and components are only reliable to a certain extent. For example, mechanical relays or timers are generally reliable for a certain number of hours of use, but beyond this level, their reliability decreases. Since failure of a single component often renders the whole appliance non-functional, improving the reliability of the appliance past a certain point is difficult while maintaining costs of the components within certain constraints.

Further, mechanical assemblies and components are designed typically to only perform basic functions. There is limited flexibility as to what the mechanical assemblies can do and how they can operate. Implementing new functions or user features is typically not possible with the existing mechanical assemblies. For example, piezoelectric buzzers are commonly employed in appliances, but the control circuitry is limited, and typically capable of only providing a singe frequency 'beep' as feedback to the user, typically in regard to notification of an error or an event (timer expiry).

Many household appliances are now becoming more "intelligent" by incorporating microcontrollers, which is feasible in part due to the low price of such microcontrollers. Many aspects of the operation are controlled not by mechanical relays and devices, but by a microprocessor executing control software. The software allows flexibility in providing new features and modes of operation.

In particular, the use of microprocessors dedicated to controlling a household appliance allows greater flexibility in interacting with the user of the device. Thus, various displays, modes of operation, and user feedback can be provided to a user by using the same microprocessor used to control the appliance.

One approach for using a microprocessor is disclosed in U.S. Pat. No. 4,490,488 to Pearman et al. Although the cost of microprocessors have become less expensive, Pearman discloses using a touch screen display and/or a tactile keyboard input which not only significantly increases the cost of the appliance, but may not be desirable from a human design and marketing aspect.

Thus, a need exists for a flexible, yet inexpensive, systems and methods of provide enhanced user interactions with a household appliance.

SUMMARY OF THE INVENTION

In one embodiment of the invention, systems are disclosed for providing user feedback to a user controlling a household appliance comprising an input device operated by the user for controlling the operational status of the appliance, a microcontroller receiving a signal from the input device and generating in response a first ouptut signal and a second output signal, a heating element receiving the first output signal, and a plurality of discrete LEDs controlled by the second output signal where the microcontroller activates at least two or more of the discrete LEDs associated with the heating element receiving the first output signal.

In another embodiment of the invention, a system is disclosed for providing user feedback to a user controlling a household appliance comprising an input device operated by the user for controlling the operational status of the appliance, a microcontroller receiving a signal from the input device and generating in response a first ouptut signal and a second output signal, and an audible sound generating receiving the second output signal and generating one from a plurality of sounds.

In another embodiment of the invention, a method is disclosed for providing visual feedback to a user of an appliance comprising receiving input from the user regarding the operation status of the appliance, determining in a microcontroller a variable output control signal controlling the operation status of the household appliance, generating at least one signal in the microcontroller activating at least one of a plurality of discrete LEDs in proportion with the variable output control signal.

In another embodiment of the invention, a method is disclosed for providing audible feedback to a user of an appliance comprising receiving input from the user regarding the operation status of the appliance, determining in a microcontroller a variable output control signal controlling the operation status of the household appliance, generating at least one signal in the microcontroller causing a sound generator to generate a tone associated with first output control signal.

These are only several of the potential embodiments of the invention and are not intended to limit or be used for interpreting the scope of the claims of the invention.

BRIEF DESCRIPTION OF THE DRAWINGS

Having thus described the invention in general terms, reference will now be made to the accompanying drawings, which are not necessarily drawn to scale.

Figure 1:
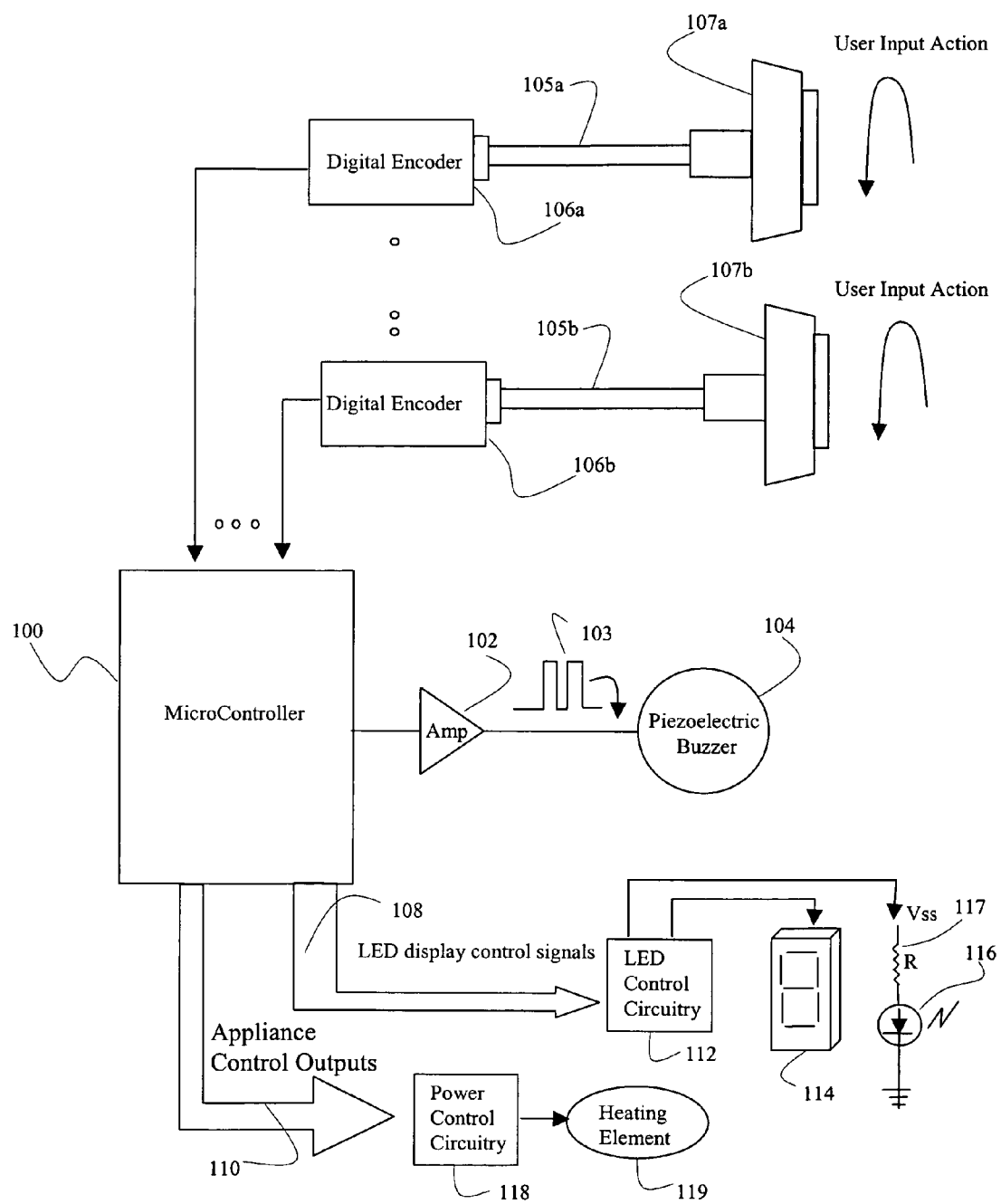

FIG. 1 depicts one embodiment of a microcontroller interfaced to a digital encoder, a piezoelectric buzzer, and a plurality of LEDs in accordance with the principles of the present invention.

Figure 2:
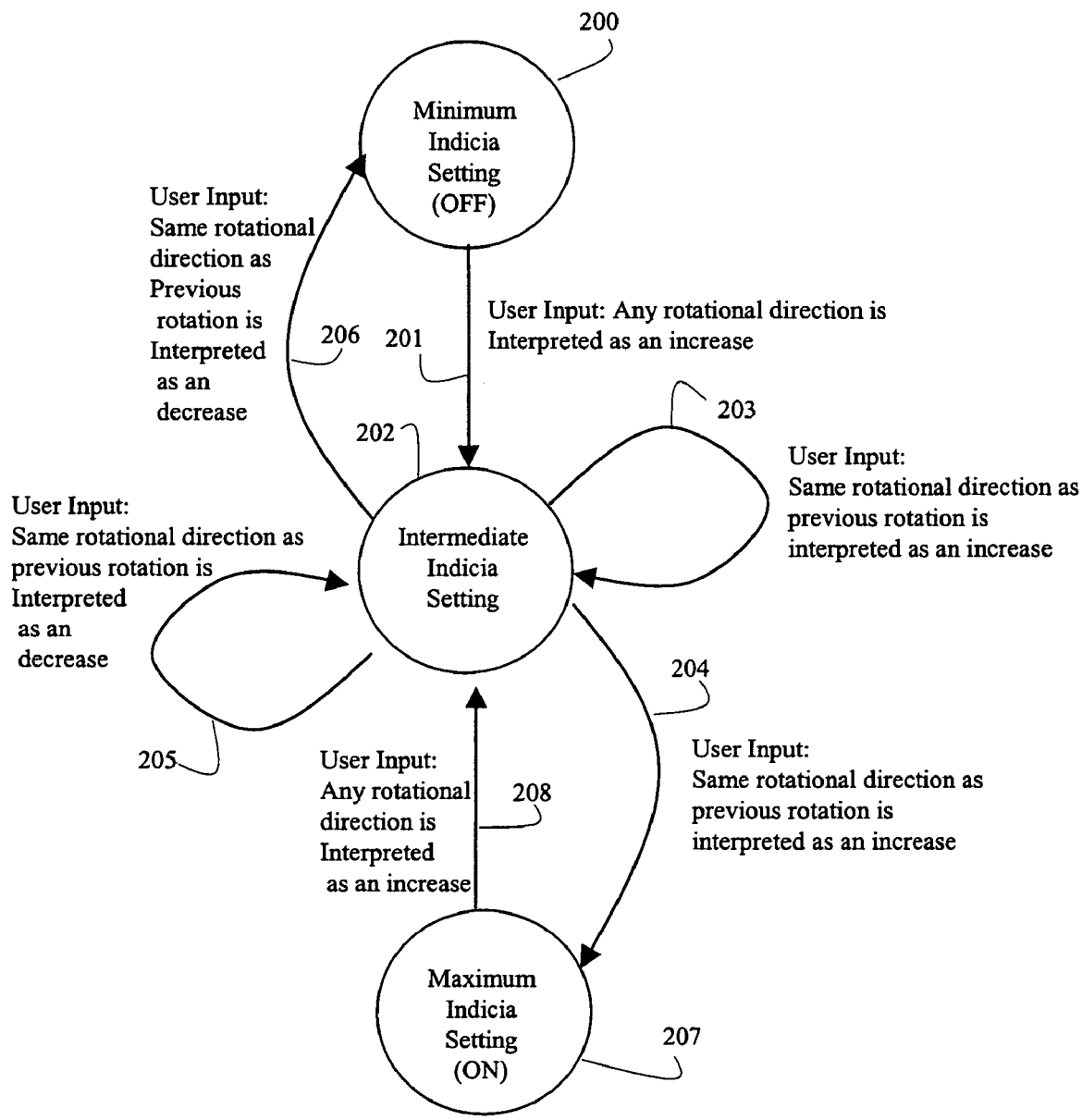

FIG. 2 depicts a state diagram associated with one embodiment of the operation of the variable input encoder according to the principles of the present invention.

Figure 3:
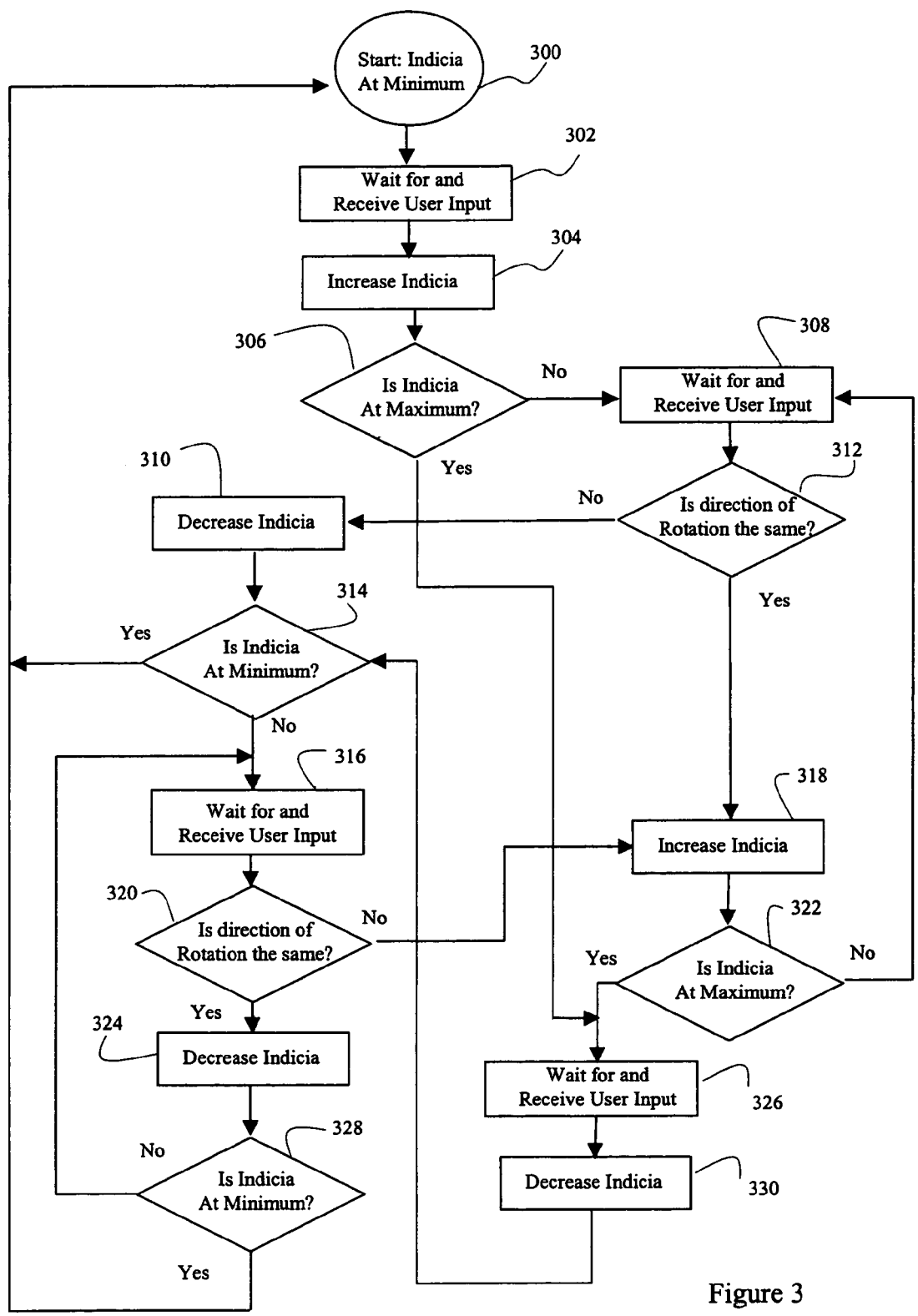

FIG. 3 depicts a flowchart associated with one embodiment of the variable encoder operation according to the principles of the present invention.

Figure 4:
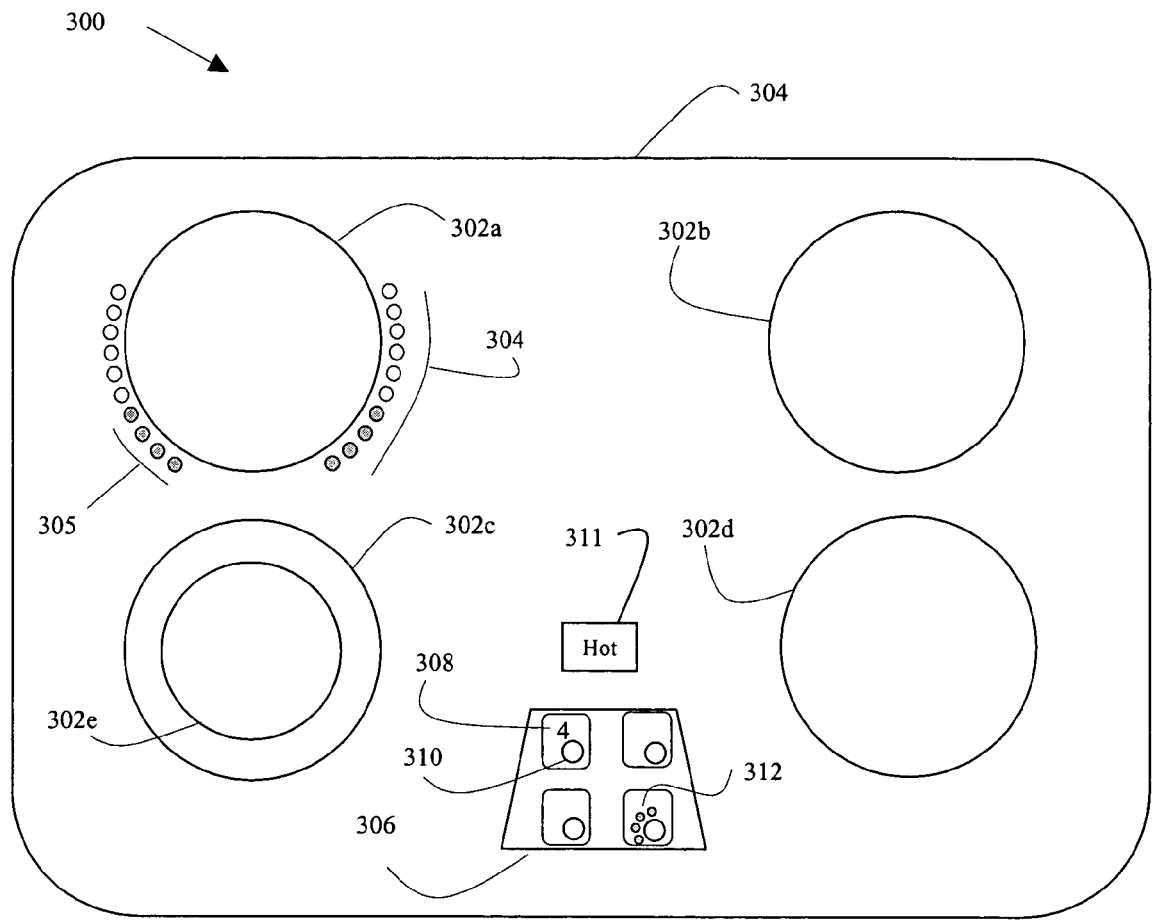

FIG. 4 depicts a household appliance associated with one embodiment of the variable feedback provided according to the principles of the present invention.

Figure 5:
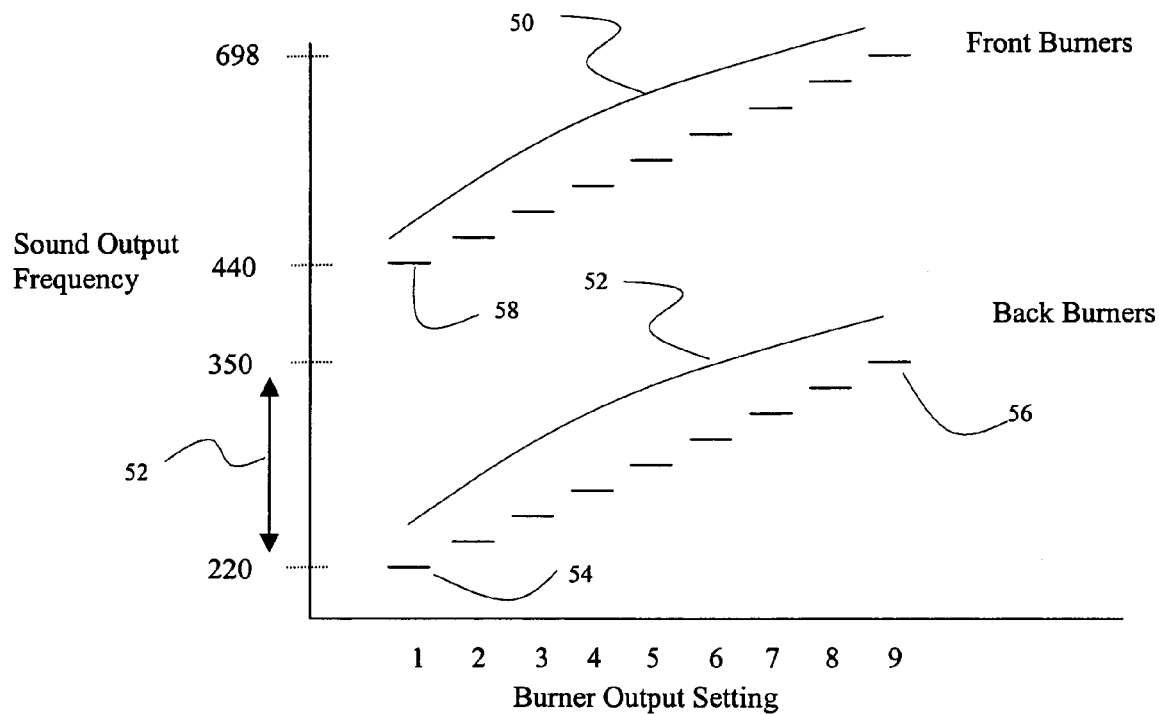

FIG. 5 illustrates one embodiment of providing aural feedback based on burner output settings according to the principles of the present invention.

Figure 6:
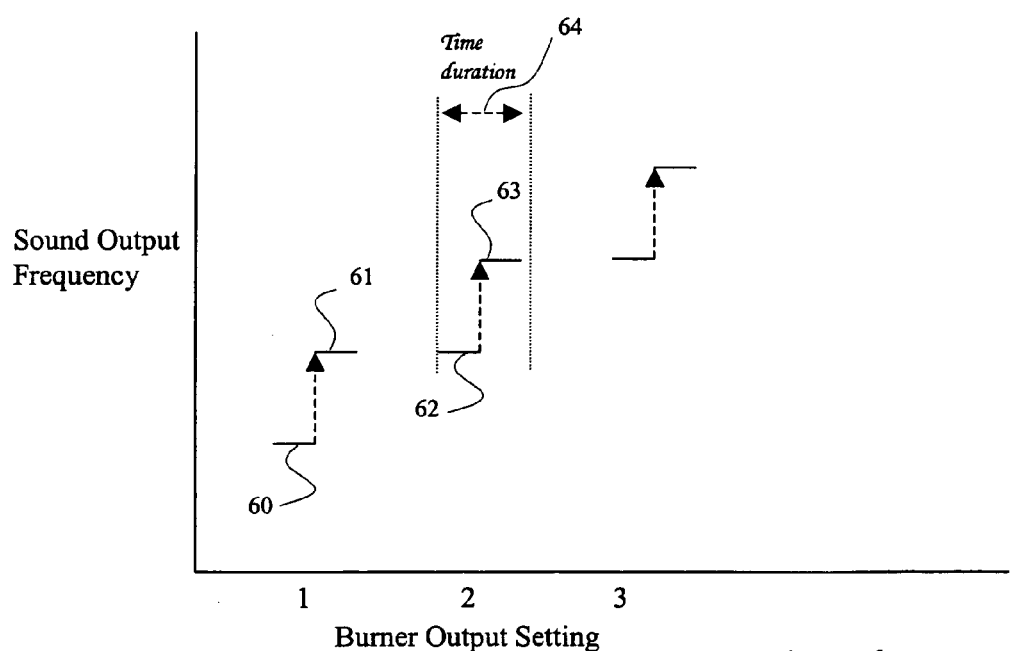

FIG. 6 is another embodiment of providing aural feedback for increasing a burner output setting according to the principles of the present invention.

Figure 7:
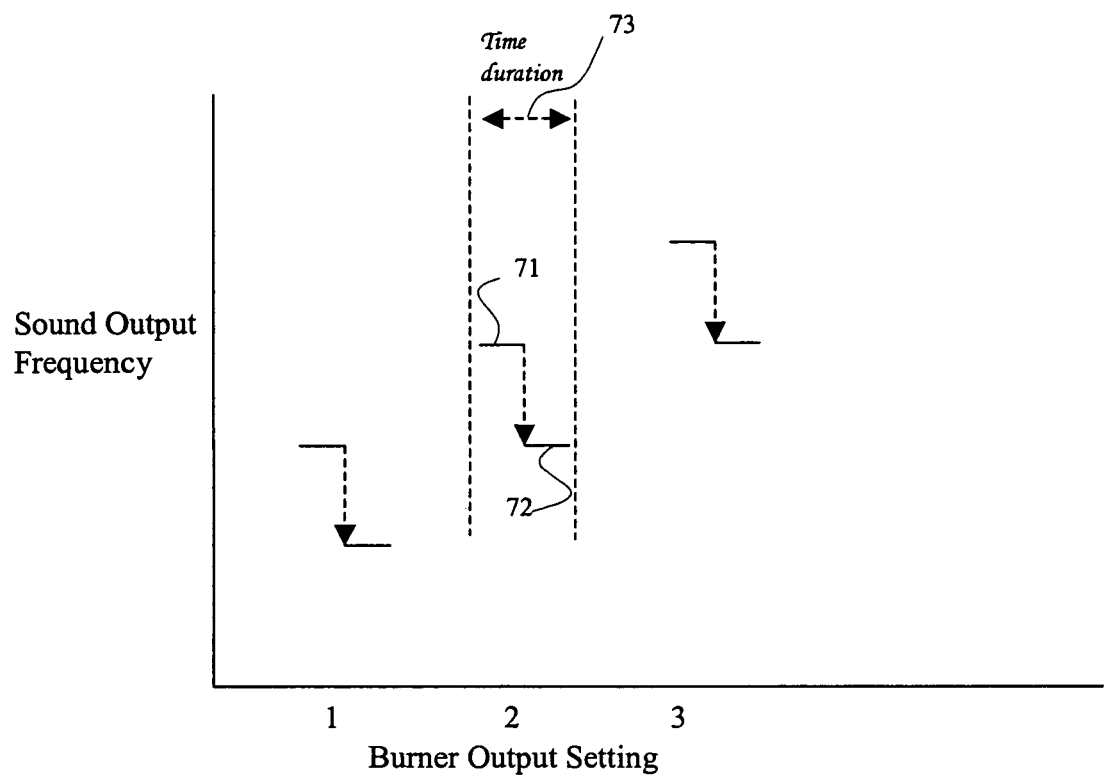

FIG. 7 is another embodiment of providing aural feedback for decreasing a burner output setting according to the principles of the present invention.

Figure 8:
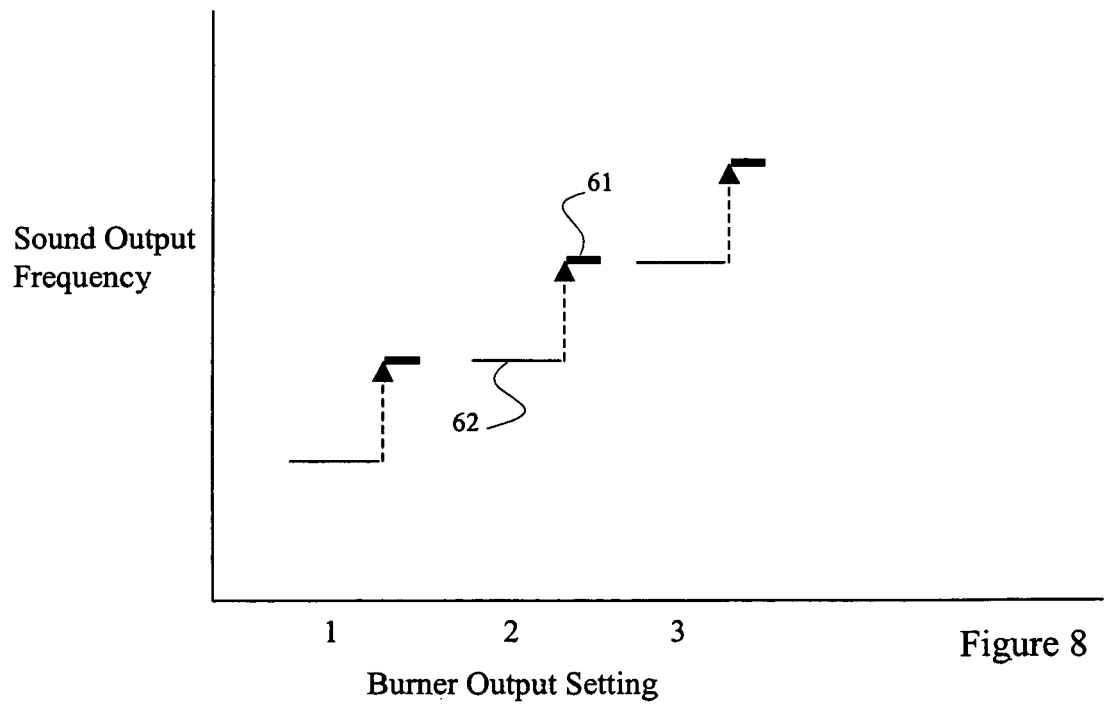

FIG. 8 is another embodiment of providing aural feedback according to the principles of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Using systems and processes described herein, the present invention generally describes using a microcontroller for greater control and enhanced user interaction with a household appliance. The utilization of microcontrollers provides flexibility in altering the operation of the control of an appliance, allowing incorporation of different features and distinguishing the household appliance from other competitive models.

Incorporation of a microcontroller allows greater flexibility in controlling the appliance, but in many cases the user interaction with the appliance is limited to the same input/output devices used prior to the introduction of microcontrollers. Consequently, many of the capabilities of the microcontroller in provided enhanced user interaction are not fully utilized.

In FIG. 1, a block diagram is disclosed for a control circuit that may be employed for controlling a household appliance. Although the application of the principles of the present invention are disclosed in the context of an electric cook top, the principles can apply to ranges, ovens, gas stoves, refrigerators, washer, dryers, dishwashers, and other types of household appliances. Further, the principles may apply to electronics devices, commercial control systems, alarm systems, and industrial applications as well.

FIG. 1 illustrates a microcontroller 100 that receives inputs from a plurality of digital encoders 106a. The microcontroller may be known by other names or implemented in various forms, such as a microprocessor operatively connected to separate memory, or a single chip microcomputer. Those skilled in the art will readily recognize that various embodiments of a microcontroller are possible, and are associated with different manufacturers. Typically, the microcontroller is a single chip processor incorporating a limited amount of memory and I/O capabilities. Many incorporate special purpose functions incorporated, such as integrated pulse-wave modulators, A/D and D/A converters, etc., and are well known in the art.

The digital encoder is also well known in the art. An incremental digital encoder provides digital signals indicating relative movement, typically relative rotation movement on a shaft. These are often used as input devices in which the shaft is affixed to a knob. Digital encoders are typically categorized as incremental or absolute. For example, incremental digital encoders may incorporate a disk around a rotating shaft where the disk has periodic holes through which light passes and is detected. This produces a digital signal, typically a pulse waveform, that can indicate how many degrees the shaft has rotated. In some embodiments, the direction of rotation is indicated, or can be derived by, looking at two pulse waveform signals. An absolute digital encoder is more sophisticated in that a series of indicia on the disk allow the absolute position of the shaft to be detected. Either type of digital encoder can be adapted for use according to the principles of the present invention. In one embodiment, the encoder provides a relative indication of rotation of a shaft with a directional indication which is interpreted by the microcontroller as a user input.

The digital encoder 106 detects the rotary movement of a shaft 105 that is typically coupled to an input knob 107. For example, on an electric cook top, the knob 107 may be located within easy reach of the user and the knob 107 is coupled to shaft. Although not shown in FIG. 1, the shaft typically passes through a hole in the surface of the cook top. The rotational movement of the shaft is detected by a rotary digital encoder 106 located inside of the appliance, which in this embodiment is an electric cook top. FIG. 1 illustrates two digital encoders, shafts, and knobs. Typically, a cook top will have one digital rotary encoder for each electric heating element ("burners"), of which there are typically four. Other embodiments may employ more or less. Further, although illustrated using a rotary directionless encoder, other types of devices may be used to provide a vector-based input signal. A vector based input signal is one that provides not only a magnitude of movement, but also a directional indication. Thus, electromagnetic potentiometers, touchpads, or a series of switches (mechanical, capacitance, electronic, or combination) can be used. Further such devices do not necessarily require the user to impart a rotation to indicate a direction. A linear motion (e.g., a 'sliding' linear potentiometer) could be used as well. Those skilled in the art will recognize that many embodiments of directional encoders and their equivalents could be used and adapted to practice the principles of the present invention.

The rotary encoders typically detect user input in the form of rotation of the knob. Because the digital encoder itself may not employ a limiting mechanism, it may be appropriate to design the shaft or knob (or even the digital encoder) such that a stop prohibits rotary movement beyond a certain point. For an electric burner control, the range of motion may be limited to 180 or 270 degrees, or some other amount. In other embodiments, the rotation of the shaft may not be limited and may rotate freely.

The output of the encoder 106 typically comprises two signals allowing the microcontroller 100 to determine amount and direction of rotation. In other embodiments, the signals from the encoders may be multiplexed together, buffered, converted, or otherwise processed. The microcontroller interprets the signals according to a software program it is executing.

The microcontroller also provides output signals. One output signal typically is provided to an amplifier 102 that in turn provides an input signal to a piezoelectric buzzer 104. The output signal 103 may in of various shapes, but in one embodiment, the output signal is a variable output signal in the form of a pulse-width modulated signal, which can be at various duty cycles, frequencies, and amplitudes so as to generate the desired sound from the piezoelectric buzzer 104. The piezoelectric buzzer is a solid state device capable of emitting a buzzing sound, although other sounds may be generated based on the output of the control signal. For example, the output signal from the microcontroller may be a pulse width modulated signal with a certain frequency, duty cycle, duration, and level so as to produce a tone corresponding with a note—e.g., "A" associated with 440 cycles per second. Although a piezoelectric buzzer is used to illustrate the application of the inventive principles, other types of audio output devices may be used, the most common alternative is a traditional ferromagnetic speaker.

Another type of output signal generated by the microcontroller is used to control various discrete LEDs 116 and/or multi-segment LED displays 114. These signals are shown in collectively in FIG. 1 as an arrow 108. Those skilled in the art will recognize that there are various approaches that can be used for activating LEDs, including providing individual control signals, multiplexing signals using additional circuitry, etc. The LEDs controlled may be a plurality of discrete LEDs 116 that typically include current limiting resistors 117 that are mounted individually or in a group as a module on a circuit board or other surface. The LEDs could also be a multi-segment LED 114 display capable of indicating a particular number, typically based on the value of an input signal. Those skilled in the art of electronics will recognize that a variety of shapes, colors, and configurations of LEDs are readily possible. Further, the LEDs are typically not driven directly by the microcontroller, but typically involve additional circuitry 112 for driving the LEDs as appropriate.

Typically, the LEDs displays are mounted in a hole or opening on the appliance, or in the case of solid surface cook tops, the LEDs may be mounted underneath a tinted glass cook top such that the LEDs are visible when activated, and 'disappear' (i.e., are not readily visible) when deactivated. In many embodiments, a single LED may light when activated and indicia, such as painted letters indicating "On" or "Hot", are affixed above the LED to the glass cook top. Thus, when the light is on, the user is able to readily detect that the cook top is "on." (See for example, FIG. 4.) The LEDs may be located in different locations, or relative to each other, in various embodiments, as will be illustrated later.

Finally, the microcontroller 110 provides various appliance control signals, shown collectively as arrow 110 for controlling the appliance functions, including in the present embodiment, activating heating elements. Typically, the microcontroller outputs are received by other circuitry 118 that controls the application of the supply voltage to the specific burner element and affects the operational status of the appliance. In other appliances, the appliance control output may control motors, compressors, pumps, displays, valves, or other mechanisms associated with the appliance's operational status. Again, the microcontroller typically does not directly drive the heating element or other devices, but relies on additional circuitry (e.g. 118 or 112) for providing the necessary power to the affected device. The heating elements may be of various types, including radiant heat, induction, or otherwise. Further, although shown circular in shape, many other configurations are possible.

Directionless Digital Encoder

It is well known to use knobs for facilitating user input to controlling the output level of a burner on an electric cook top. In many cases the knobs are attached to a shaft and rotate a heavy-duty potentiometer directly controlling the burner. With the microcontroller, a digital encoder may be use to receive user input. In one embodiment of the present invention, the microcontroller interprets the signals from the digital encoder and adjusts the appliance control output signals in response. For purposes of illustration, the microcontroller stores a numerical value ("indicia") in a register that is altered based, in part, by the user input. The indicia value also corresponds, indirectly or directly, to the level of a control signal output level. In one embodiment, when the burner is "off", i.e., it is not receiving any power or generating any heat, the indicia value is zero. When the knob is turned by the user, the digital encoder indicates signals to the microcontroller and the microcontroller determines the amount of rotation relative to a defined scale and increases the value of the indicia accordingly, independent of the direction of rotation. Thereafter, for microcontroller 'remembers' the direction of rotation and interprets signals from the digital encoder corresponding to the same direction of rotation as "increasing" the indicia, and signals from the digital encoder corresponding to the opposite direction of rotation as "decreasing" the indicia (and output of the burner). Thus, when the burner is off (e.g., the indicia is zero), rotating the knob in any direction will increase the output to the burner. Further rotating the knob in the same direction further increases the output, until the maximum allowed level is reached. At any point, rotation in the opposite direction is interpreted as decreasing the desired input, until of course, the indicia is zero.

Based on the previous experience of the user with appliance controls, the user may expect clockwise (or counter-clockwise) rotation to increase the burner output. Using a directionless digital encoder allows either rotational direction to be used initially by a user to activate and increase a burner, and the other direction to decrease and turn off the burner. Because there is no single standard of rotation used for all appliances, this embodiment can accommodate either rotational direction as increase the indicia.

The microcontroller stores a directional indicator as to which direction was initially used to turn the burner on, and stores this directional value until the burner has been turned off. Once off, either direction again may be used to turn on the burner. In the embodiment just described, the microcontroller stores rotational directional indication for the duration of the time that the indicia is non-zero.

This embodiment allows a kitchen appliance to accommodate different customs of usage by the user. In many cases, certain appliances use a counter-clockwise direction to activate a burner (which is quite common with manual gas valves on gas ranges) while other appliances (such as electric ranges) use a clock-wise rotational direction to activate a burner.

In another embodiment, the microcontroller stores the rotational directional indication only until the maximum indicia value is reached. The operation associated with this embodiment is described in FIG. 2. FIG. 2 illustrates a state diagram of the relationship of the user rotation of the directionless digital encoder and the microcontroller's interpretation of the signals generated therefrom. As before, it is presumed that the digital encoder results in an indicia being increased or decreased, and that effects the output of a burner. The process begins in FIG. 2 in the initial state 200 with a minimum indicia setting in which the burner is "off".

Although the initial state is illustrated as being in the "off" position with a minimum indicia setting, other embodiments may defined the initial state as being "on" and/or with a maximum indicia setting. Line 201 represents user input by turning the knob on the directionless encoder. In this instance, any rotational direction is interpreted by the microcontroller as increasing the indicia (e.g., increasing the power to the burner). Typically, the increase in the indicia is proportional to the degree of rotation of the shaft, relative to some scale. For example, the microcontroller may interpret the range of rotation from minimum to maximum as corresponding to 180 degrees rotation of knob, so that a quarter turn (e.g., 90 degrees) results in half of the maximum indicia level and half of the maximum power to the burner. Variations on the scale, maximum rotational amount and how the microcontroller varies the control output signal based on the inputs are readily possible and within the principles of the present invention.

Although the user may perceive rotating the knob 90 degrees as one continuous action, the actual operation of the digital encoder is that of providing a series of pulses to the microcontroller. Thus, the microcontroller interprets the single action as a series of multiple single step rotations. The first pulse received places the microcontroller in the intermediate indicia setting state 202. This state represents an indicia that is more than zero and less than the maximum. Each subsequent pulse received from the digital encoder associated with the quarter turn of the knob will be in the same direction. Each of these inputs is represented by line 203 and results in incrementing the indicia, but returns the microcontroller to the same state 202.

Assume instead of turning the knob partway, that the user turns the knob all the way to maximum. Typically, there will be a mechanical stop, so that turning the knob beyond 180 degrees is not possible. This again would result in a sequence of pulses, in which the microcontroller increases the indicia and returns to the intermediate indicia state. However, upon incrementing the indicia for the last time, e.g. when the maximum indicia value is obtained as represented by line 204, this places the microcontroller in the maximum indicia setting state 207. In this state, the indicia is at a maximum, and the microcontroller provides a maximum output control signal, typically causing the burner to generate maximum heat.

Assuming at some later time (e.g., when cooking has been completed), the user then turns off the burner by rotating the knob. In the previous embodiment, decreasing the burner required turning the knob in the opposite direction. In this embodiment, either direction of rotation is interpreted by the microcontroller as decreasing the indicia and output of the burner. Thus, in line 208, any rotational direct reduces the indicia and the output of the burner. Since the turn of the knob typically results in a plurality of pulses, the microcontroller interprets the first pulse and direction and returns to the intermediate indicia setting state. Then, subsequent pulses in the same direction are interpreted as decreasing the indicia. Finally, when the indicia changes from 1 to 0 (assuming whole numbers are used to represent the indicia), the microcontroller then moves to the minimum indicia setting state 200, which equates to the burner being turned off.

Thus, in this embodiment, any knob rotation direction turns the burner on, and that same direction is used to increase the burner output level. The opposite direction then decreases the burner output level. However, once the maximum level is obtained, then either direction may be used to decrease the burner, until the burner is off. Once the burner has been decreased by turning the knob in a given direction, and the burner is still on, then turning the knob in the other direction will increase the burner's output.

In some embodiments, a timer or counter may be used once the maximum level is reached. For example, assume the indicia ranges from 0 to 100. When the knob is turned in a given direction, the indicia increases. When going from 99 to 100, the microcontroller is now at its maximum. If the user were to accidentally continue turning the knob (e.g., the mechanical stop wears, slips, or is defective), the microcontroller would normally consider this an input that would then decrease the indicia. In one variation of this embodiment, the microcontroller may ignore the next certain number of input pulses (e.g., 10 pulses) after the maximum indicia has been reached, before then decreasing the indicia. Alternatively, a timer could be used so that once the maximum level is reached, additional inputs for a limited time (e.g., 100 milliseconds) would not be interpreted as decrementing the indicia. This would prevent "overshoot" in which the user rapidly attempts to turn the knob to maximum capability.

Turning to FIG. 3, a flowchart illustrating one embodiment of the microcontroller processing of the encoder input is shown. The process begins at the Start 300 step, with the indicia at a minimum (e.g., zero). The microcontroller then waits for user input at the next step 302, which is in the form of rotating the knob connected to the directionless encoder resulting in output signals generated by the encoder. These signals are interpreted as increasing the indicia in step 304 regardless of the direction of turning, since any turning of the encoder can only increase the indicia. The microcontroller tests whether the indicia has reached its maximum at step 306. If the maximum has not been reached, the microcontroller then waits for the user to turn the knob again in step 308. If additional input is received, it is tested at step 312 to see if it is in the same direction. If it has, then in step 318 the indicia is increased. If the indicia is not at its maximum in step 322, then the process returns to step 308 and continues.

If however at step 306 the maximum value is reached, than the system proceeds to step 326 and waits for additional input. Although not shown, a timer may be employed so that repeatedly increasing the indicia by turning the knob at its maximum does not result in immediately decreasing the indicia (thus avoiding the 'overshoot' condition). After step 326, any further input at step 330 results in the indicia decreasing. Similarly, steps 326 and 330 are executed if the indicia reaches a maximum at step 322.

Once the indicia is being decreased, either from testing at step 312 or from the result of step 330 or 310, the indicia is tested at step 314 to determine whether the indicia is at a minimum. If not, then the process continues to receive user input at step 316, and if the direction of rotation is the same, decreases the indicia in step 324 and again testing whether it is at a minimum in step 328. If the indicia is not at a minimum, the process loops to step 316. If the indicia is at a minimum, either from the test at step 314 or 328, then the process loops around to step 300.

Those skilled in the art realize that other logic flows to implement the same logic can be defined, and that modifications are possible to the disclosed flowchart. For example, in another embodiment, rotating the directionless encoder in one direction increases the indicia until the maximum is reached and then decreases the indicia until a minimum is reached, and then the cycle continues. The determination of the indicia value is based on the processing logic programmed into the microcontroller, and different variations are possible. However, in any case, the value determined for the indicia requires the programming logic of the microcontroller to properly interpret the signals from the directionless encoder.

Output Devices

As illustrated, the microcontroller may use the indicia to directly vary the appliance output control signals 110 of FIG. 1 in order to alter the output level of a burner, open a valve, or perform some other action. In addition, or separately, the microcontroller may also vary signals to various feedback devices, such as the LED display control signals 108 or to the piezoelectric buzzer 104. Although the feedback devices are illustrates as a piezoelectric buzzer 104 of FIG. 1 or LEDs, other types of aural and visual feedback devices can be used, such as ferro-magnetic speakers or LCD displays displaying graphics or icons.

Visual Output Devices

FIG. 4 illustrates one type of visual feedback indicator that may be provided to the user. In FIG. 4, an electric smooth-surface cook top 300 is illustrated. In one embodiment, the cook top operates using the principles of induction heating. In this case, the induction heating elements are also considered as being electric heating elements. In other embodiments, another form of heating element, a radiant heating element, may be employed. In this mode of operation, the heating elements or "burners" 302a, 302b, 302c, 302d create a rapidly changing magnetic field that causes ferrous-based cooking containers to heat. Thus, when a "burner" is "on", it is not readily apparent to the user by a red glow of radiant heat under the cooking container as is observed with radiant electric heating elements. Other embodiments may use other forms of resistance based heating elements or heating element with different areas of coverage (e.g., rectangular). For example, one burner 302c may have a reduced area of coverage 302e, which represents a lower heat setting. This may be indicated on the glass cook top surface by a circular indicia of a different size within a larger circular indicia.

The cook top 300 typically comprises a tempered glass surface 304. The glass is typically tinted a dark color (e.g., black) so that the burner elements 302 are not readily visible. Rather, an outline of the burner areas on the glass surface are indicated using indicia (e.g., etching or paint on the glass surface). Further, the cook top also includes a control area 306 that typically has four controls 310 typically corresponding to a particular burner. The control area may also have a numerical value 308 displayed associated with the power provided to the burner when the corresponding burner is turned on. In the embodiment of FIG. 4, the upper left burner 302a is turned on to a level of "4" 308. Typically, a range from 1–9 is indicated (although other ranges may be used, such as 1–10, or 0–9). Although the number provides one form of visual feedback to the user, the control area 306 may be covered by other cooking utensils, and/or the numerical value 308 may not be readily viewed by the user. Thus, many cook tops also include an indicator, such as a LED under an area with indicia indicating "hot" 311. This provides an indication that one of the burners is activated. However, if utensils or other cooking paraphernalia are present, the center areas may not be readily viewable to the user and may not be readily apparent to the user burner is activated.

Thus, another form of visual indication may be provided to the user in the form of LEDs associated with the burner that is currently activated. In this embodiment, a series of LEDs are arranged in a semi-circular arc around each burner. These LEDs are typically located under the tinted glass, so they are not readily viewable when they are off, but when turned on, the illuminate through the glass cooking top. In the embodiment shown in FIG. 4, a series of ten LEDs 304 are arranged on each side of the burner. When a particular output level of the burner is selected using the control knob 310, the corresponding numerical level 308 is displayed in the control area 306 and a corresponding number of LEDs are activated 305. In this embodiment, an output level of "4" corresponds to four LEDs 305 activated on both series of LEDs for the associated burner and corresponds to the burner operating at 40% of maximum output. Typically, as the output level increases, the number of LEDs activated increases until a maximum level is reached and all the LEDs are activated on both sides of the corresponding burner. This provides the user a ready visual indication of which burners are on, and their respective output levels. The user can readily detect this information, even if the control area is obstructed. Variations on the number and placement of the LEDs or other visual indicators are readily possible. For example, a series of LEDs 312 could be placed in an arc shape around the control knob 310 in the control area 306 providing ready feedback as to the degree of rotation of the knob.

Audible Output Devices

Feedback can also be provided to the user in audible form. Using the piezoelectric buzzer, audible tones or variable pitches may be provided to the user to indicate a specific burner setting level, increase or decrease of a burner setting, and/or identifying a particular burner being activated. The use of an audible feedback allows users that may be visually impaired to gain greater operational control of the appliance.

FIG. 5 shows one embodiment of the type of audible feedback scheme that can be provided to the user. In this scheme, the back burners share a common scheme of sounds at one tonal range 52 and the front burners share a common scheme of sounds 50 at another tonal range. There are nine (1–9) burner settings that may exist for any burner and each setting corresponds to a particular sound frequency. For example, if a back burner is set on "1" the sound 54 generated corresponds to a certain frequency, which in this embodiment is 220 Hertz (corresponding to "A" on a piano below middle "C"). In contrast, when a front burner is set to "1", the sound output is 440 Hz (one octave higher, known as "concert A"). In this embodiment, each setting corresponds to a half tone note according to the so called "American Standard Pitch" tonal scheme, where the first setting corresponds to an "A", the second pitch correspond to an "A#", and the highest setting would correspond to a "F". Thus, the front burner will have a feedback range 52 from 220 Hz corresponding with the first setting 54 to about 350 Hz (349.228 Hz exactly) corresponding to the highest setting 56. Each output tone is typically of a fixed duration (such as 500 milliseconds) and of a fixed volume. However, it is possible in other embodiments that each setting would have a different duration, tone, or volume.

Although two sets of frequencies 50, 52 are disclosed, (one for the front burners and the other for the back burners) other embodiments may have four sets of frequencies, one corresponding to each burner. Although having four ranges may be difficult for users to correlate to a particular burner, alternatively different scales (major or minor) can be used to distinguish between left and right burners. This scheme allows easier audible identification of an individual setting on a specific burner.

This represents one embodiment of applying a chromatic scale to provide aural feedback of the settings. Various other embodiments, in which other scales, frequencies, and notes corresponds to each burner's settings are possible. Typically, an increase of frequency corresponds to an increase in the burner output.

FIG. 6 illustrates another embodiment in which aural feedback can be varied according to the burner output setting based on increasing the burning setting. In FIG. 6, each output setting corresponds to two output tones. For example, burner output "1" corresponds to a lower tone 60 that migrates to a higher tone 61. Similarly, burner output setting "2" had two tones 62 and 63. Consider the case where the user has the burner setting on "1", but then switches the output to "2." In this embodiment, when a change is detected, the microcontroller is programmed to indicate an audio output for "2" in which a tone corresponding to a lower frequency 62 is provided for a fixed time (e.g., 250 milliseconds) and then shifts to a higher tone 63 for another fixed time period (e.g., 250 milliseconds). Thus, the overall time duration 64 of the tone is 500 milliseconds. The user then is able to detect an increasing in tone and associates this with an increase in the burner output. The first tone may correspond to the previous burner output setting, while the second tone corresponds to the current burner output setting. Further, the user will also be able to determine the relative output of the burner based on the second tone 63 of the sequence. Thus, the user can aurally ascertain the relative setting of a particular burner.

Similarly, in FIG. 7, when the user is decreasing the burner output, the tones may be provided in a decreasing manner. For example, the first tone 71 represents the tone of the previous output setting, while the second tone 72 indicates the current setting.

Finally, FIG. 8 represents another embodiment, in which the lower tone 82 is of a certain frequency and at a certain volume, but when the second frequency 61 is provided, it is at a louder volume (denoted by the thicker lines 61). In this manner, a more distinctive emphasis on the direction of change may be indicated to the user. Alternatively, this type of scheme may be used to different between left/right or back/front burners.

Those skilled in the art will recognize that various combinations of frequencies, tonal progressions, and duration may be used to indicate to the user the change in status of a particular output burner.

Further, the tonal combination could be customized according to the preferences of the user. Since certain users may be hard of hearing at certain frequencies, it may possible to configure the microcontroller to shift the tones down an octave, or increase the volume overall to a greater level.

It should be emphasized that the above-described embodiments of the present invention are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

In concluding the detailed description, it should be noted that those skilled in the art will observe that many variations and modifications can be made to the preferred embodiment without substantially departing from the principles of the present invention. Also, such variations and modifications are intended to be included herein within the scope of the present invention as set forth in the appended claims.

Further, in the claims hereafter, the structures, materials, acts and equivalents of all means or step-plus function elements are intended to include any structure, materials or acts for performing their cited functions.

We claim:

1. A system for providing user feedback comprising:
an input device operated by a user to indicate a desired operational status of a household appliance;
a microcontroller controlling a household appliance, the microcontroller receiving input from the input device, the microcontroller providing in response a first output signal and a second output signal;
a plurality of heating elements operatively connected to the microcontroller, at least one of the plurality of heating elements activated to generate heat in response to the first output signal; and
a plurality of discrete LEDs controlled by the second output signal, the microcontroller activating a number of the plurality of discrete LEDs in proportion to the first output signal.

2. The system of claim 1 further comprising:
a multi-segment LED display operatively connected to the microcontroller and displaying a numerical indication to the user associated with the first output signal.

3. The system of claim 2 wherein the number of the plurality of discrete LEDs activated is equal in number to the numerical indication displayed by the multi-segment LED display.

4. The system of claim 1 wherein the plurality of discrete LEDs are arranged in an arc-shape around the perimeter of the heating element.

5. The system of claim 1 wherein the plurality of discrete LEDs are arranged in an arc-shape in proximity to the input device.

6. The system of claim 1 wherein the input device comprises a rotational directionless encoder.

7. The system of claim 1 wherein all of the plurality of discrete LEDs are activated when the first output signal results in the heating element generating maximum heat.

8. The system of claim 1 wherein the household appliance is a cooktop.

9. The system of claim 1 wherein the heating element generates heat by induction.

10. The system of claim 1 wherein the plurality of discrete LEDs are of different wavelengths generating different visible light.

11. A method of providing visual feedback to a user of a household appliance comprising:
receiving input regarding a operational status of the household appliance from the user at a microcontroller controlling the operation of the household appliance;
determining in the microcontroller a variable output control signal controlling the operational status of a heating element;
generating at least one signal in the microcontroller activating a number of a plurality of discrete LEDs in proportion with a level of the variable output control signal, the number of discrete LEDs activated indicating the operational status of the heating element.

12. The method of claim 11 further comprising:
receiving the variable output control signal at the heating element of the household appliance.

13. The method of claim 12 wherein the variable control signal causes the heating element to generate heat by induction.

14. The method of claim 11 further comprising:
generating in the microcontroller a digital signal determined in part by the variable output control signal; and
providing the digital signal to a multi-segment LED indicating a numerical value associated with the operational status of the heating element.

15. The method of claim 14 wherein the numerical value indicated on the multi-segment LED associated with the operational status of the heating element is equal to the number of discrete LEDs activated.

16. The method of claim 11 wherein the input regarding the operation status of the household appliance is provided by the user to turn on one of a plurality of heating elements.

17. The method of claim 11 further comprising the step of generating one sound from a group of sounds associated with a level of the variable output control signal.

18. A system for providing user feedback comprising:
an input device operated by a user generating a user determined input signal to indicate a desired operational status of a household appliance;
an audible sound generator receiving a variable input signal and capable of generating a sound of one of a plurality of frequencies in response to the variable input signal;
a microcontroller controlling the household appliance, wherein the microcontroller is configured for:
receiving the user determined input signal from the input device, and
generating an appliance control signal and the variable input signal, wherein the appliance control signal controls a heating element on the household appliance, and
wherein the variable input signal is determined in part by the user determined input signal, and wherein further, the variable input signal is of a characteristic to generate the sound correlated with the appliance control signal.

19. The system of claim 18 wherein the frequency produced by the audible sound generator is a tone based on the American Standard Pitch tonal progression.

20. The system of claim 18 further comprising:
a burner receiving the appliance control signal and generating heat in response thereto.

21. The system of claim 20 wherein the frequency generated by the audible sound generator is in proportion to the appliance control signal.

22. The system of claim 20 wherein the audible sound generator produces a first frequency followed by a second frequency in proportion to a change in the user determined input signal.

23. The system of claim 22 wherein the first frequency followed by the second frequency is determined in part by the appliance control signal,
wherein the appliance control signal is increased or decreased based on the user determined input signal.

24. A system for providing user feedback comprising:
an input device operated by a user to indicate a desired operational status of a household appliance;
a microcontroller controlling the household appliance, the microcontroller receiving input from the input device, the microcontroller providing in response a first output signal and a second output signal;
one of a plurality of heating elements operatively connected to the microcontroller and generating heat in response to the first output signal; and
an audible sound generator controlled by the second output signal, the microcontroller determining the second output signal based in part on the first output signal and causing the audible sound generator to generate one frequency selected from a set of frequencies based on the first output signal.

25. The system of claim 24 wherein the microcontroller further causes the audible sound generator to generate a sound of a defined frequency that is associated with the one of the plurality of hearing elements.

26. The system of claim 24 wherein the audible sound generator is a piezoelectric buzzer.

27. The system of claim 24 wherein the household appliance is a cooktop.

28. The system of claim 24 wherein the second output signal is a pulse width modulated signal.

29. The system of claim 24 wherein the microcontroller is capable of selecting the one frequency to be produced by the audible sound generator from a set of at least nine frequencies.

30. A method of providing audible feedback to a user of a household appliance comprising:
receiving input at a microcontroller from the user altering the operational status of a burner on the household appliance;
determining from a plurality burners the burner of which the operation status is to be altered;
determining one signal from a plurality of audio control signals that is associated with the burners and in proportion to power provided to the burner; and
providing the audio control signal determined to an audio output device.

31. The method of claim 30 further comprising:
determining whether the input from the user increases or decreases the output level of the burners; and
determining one signal from a plurality of audio control signals based in part on whether the power provided to the burner is increased or decreased.

32. The method of claim 30 wherein the step of providing the audio control signal to an audio output device comprises providing the audio control signal to an audio output device to generate a tone.

33. The method of claim 32 wherein the tone is based on the American Standard Pitch series of tones.

34. The method of claim 30 wherein the audio output device is a piezoelectric audio device.

35. The method of claim 34 wherein the audio output device is accompanied by a varying visual indicator.

36. The method of claim 35 wherein the varying visual indicator is comprised of a plurality of discrete LEDs.

* * * * *

UNITED STATES PATENT AND TRADEMARK OFFICE
CERTIFICATE OF CORRECTION

| | | |
|---|---|---|
| PATENT NO. | : 7,069,090 B2 | |
| APPLICATION NO. | : 10/910187 | |
| DATED | : June 27, 2006 | |
| INVENTOR(S) | : Huffington et al. | |

It is certified that error appears in the above-identified patent and that said Letters Patent is hereby corrected as shown below:

Column 14,

Line 15, "hearing" should read --heating--.

Signed and Sealed this

Nineteenth Day of December, 2006

JON W. DUDAS
*Director of the United States Patent and Trademark Office*